United States Patent [19]

Stashko

[11] Patent Number: 4,507,024
[45] Date of Patent: Mar. 26, 1985

[54] CUTTING INSERT WITH CHIP CONTROL

[75] Inventor: Daniel R. Stashko, Holly, Mich.

[73] Assignee: GTE Valeron Corporation, Troy, Mich.

[21] Appl. No.: 639,533

[22] Filed: Aug. 9, 1984

Related U.S. Application Data

[63] Continuation of Ser. No. 431,996, Sep. 30, 1982, abandoned.

[51] Int. Cl.³ .............................................. B26D 1/00
[52] U.S. Cl. .................................................... 407/114
[58] Field of Search ............... 407/113, 114, 115, 116, 407/117

[56] References Cited

U.S. PATENT DOCUMENTS

| | | | |
|---|---|---|---|
| 4,288,179 | 9/1981 | Kruger et al. | 407/114 |
| 4,340,324 | 7/1982 | McCreery | 407/114 |
| 4,367,990 | 1/1983 | Porat et al. | 407/115 |

FOREIGN PATENT DOCUMENTS 2055636  3/1981  United Kingdom ............... 407/114

*Primary Examiner*—Leonidas Vlachos
*Assistant Examiner*—Jerry Kearns

[57] ABSTRACT

A cutting tool for improved material removal efficiency at relatively high feed rates is disclosed. In a preferred form of an indexable polygonal cutting insert, an edge land and chip contacting ramp surfaces in at least a top face of the insert are advantageously arranged for reduced cutting forces and friction, ample cutting edge strength and inducement of free chip flow. In order to overcome deleterious chip convergence and resultant high pressures in the vicinity of the nose radius of the cutting corner of the insert, a recessed control surface is positioned in each corner portion of the polygonal insert.

14 Claims, 11 Drawing Figures

CUTTING INSERT WITH CHIP CONTROL

This application is a continuation of Ser. No. 431,996, filed Sept. 30, 1982, now abandoned.

BACKGROUND OF THE INVENTION

1. Field of the Invention

The invention relates generally to cutting tools for machining chip forming materials. More particularly, the invention concerns cutting inserts incorporating chip control geometry particularly advantageous at relatively high feed rates.

2. Description of the Prior Art

Conventional chip control inserts exhibit performance problems when used at relatively high feed rates, for example, rates exceeding 0.020 inches per revolution. These problems are caused by collision of chips produced by the cutting process colliding with one or more portions of such prior art insert faces resulting in excess friction and wear which, in turn, leads to premature wear and/or fracture of the cutting insert material.

Examples of prior art disclosing chip control cutting inserts which, at higher feed rates, present geometries resulting in adverse chip flow impediment are:

U.S. Pat. No. 4,288,179-Kruger et al
U.S. Pat. No. 3,395,434-Wirfelt
U.S. Pat. No. 3,381,349-Newcomer
U.S. Pat. No. 3,213,716-Getts

SUMMARY OF THE INVENTION

Accordingly it is an object of this invention to provide a cutting tool for use at relatively high feed rates and utilizing chip control geometry effective to overcome the above problems with the prior art.

The invention is embodied in a preferred form as an indexable cutting insert for machining chip forming materials, the insert incorporating improved chip control when used at relatively high feed rates. A land extends arond at least one chip breaking or rake face of the insert adjacent the insert cutting edges and cutting corners. Connected to the land is a first ramp or chip control surface extending downwardly and away from the peripheral insert land. The first ramp surface is interrupted at each cutting corner of the insert by a corner control plateau or surface to prevent damage caused by chip convergence to the trailing side of the active cutting corner. A second ramp or control surface lies adjacent the first ramp surface and extends downwardly and inwardly from the first ramp, preferably at a smaller inclination angle than that of the first ramp. A third ramp surface connects an inner boundary of the corner control surfaces to the second ramp surface at each insert corner region.

The combined ramp and control surfaces effect relatively facile chip flow at relatively high feed rates, thereby lessening attendant cutting forces and friction.

The combined geometries of the various insert face portions also enable better control of chips at relatively high feeds, due to causing formation of chips having convex shaped cross sections.

Polygonal inserts designed in accordance with this invention will exhibit prolonged useful life, since their chip handing capability will more effectively combat edge crater and washout.

BRIEF DESCRIPTION OF THE DRAWING

These and other objects and features of the invention will become apparent from a reading of a detailed description of a preferred embodiment, taken in conjunction with the drawing in which.

DETAILED DESCRIPTION

To better point out the advantages of the invention, reference is first made to the various chip control configurations of the prior art set forth in FIGS. 1-4. Prior art inserts incorporating the chip control geometries depicted in FIGS. 1, 2 and 4 each depend upon shoulders (102 of FIG. 1, 204 of FIG. 2 and 404 of FIG. 4) to curl and direct chips generated by respective cutting edges 100, 200, 400 of FIGS. 1, 2 and 4. Each such insert is adequate at relatively low feed rates, for example, on the order of about 0.020 inches per revolution, or less. However, such shoulders become detrimental at thick-chip-producing high feed rates. Collision of thicker chips with these shoulders generates excessive friction (therefore heat) and wear. Excessive heat, in turn, causes chemical reaction between the workpiece chips and insert material (such reaction also known as edge build-up). Such chip deflection shoulders thereof, under heavy feed rate conditions, soon wear away resulting in diminished insert useful life.

Figure 3:
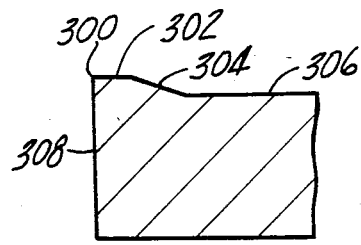

The prior art insert of FIG. 3 has a cutting edge 300 defined by the intersection of flank surface 308 and land 302 followed by sloping surface 304 and flat inner floor surface 306. The insert of FIG. 3 is more efficient at higher feed rates, but since the insert must be mounted in a negative attitude (i.e. with face 306 tilted upwards with respect to edge 300) to achieve flank clearance between the insert surface 308 and the workpiece being machined, a friction generated surface is still presented to disrupt the chip flow.

Figure 1:
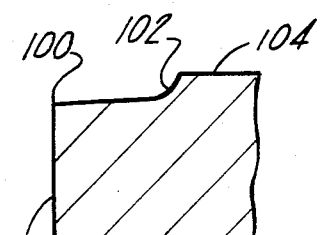
FIGS. 1, 2, 3 and 4 illustrate cross sectional views of various prior art chip control configurations used in the chipbreaking or rake face of known cutting inserts.
Figure 2:
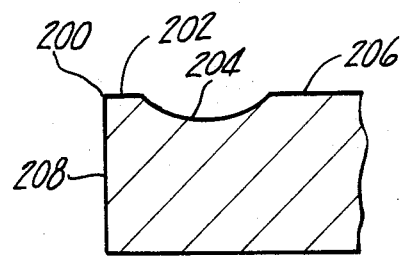
Figure 4:
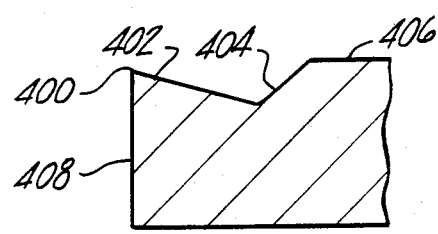

Another disadvantage to using chip control inserts designed in accordance with FIGS. 2, 3 and 4 at high feed rates arises from use of an internal cup-shaped depression within the insert nose radius. During the material cutting process, the chip is forced down into such a depression while simultaneously attempting to curl at 90 degrees to the direction of feed. This compound chip motion subjects the insert's chip control contour geometry to excessive forces caused by attempting to bend a relatively thick chip in two different directions simultaneously. Such excessive force in the nose radius area tends to wash out, or fracture, the trailing edge of the nose radius at the insert's active cutting corner, thus shortening useful insert life.

Figure 5:
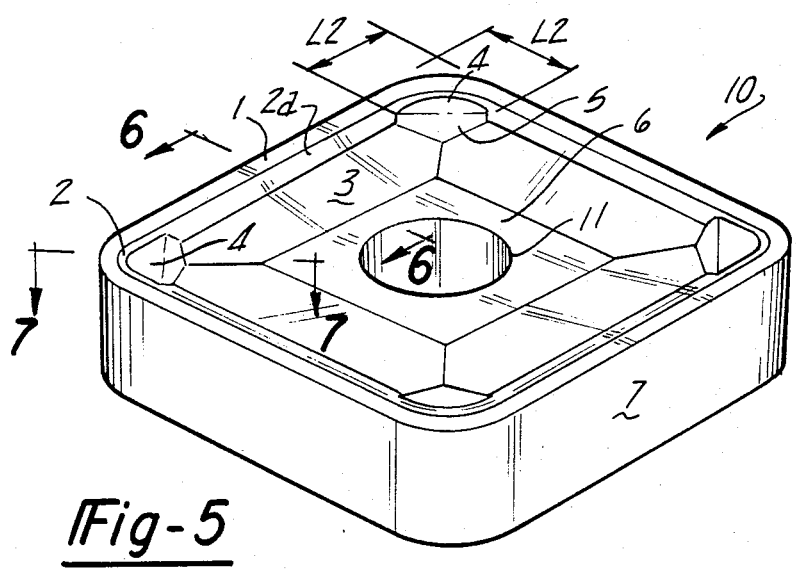
FIG. 5 is a perspective view of an insert designed in accordance with the principles of the invention.
Figure 6:
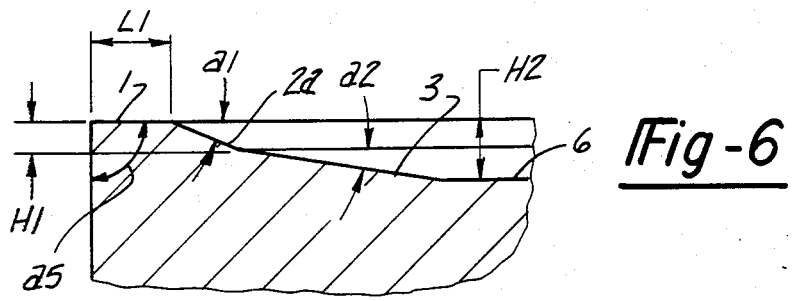
FIG. 6 is a view taken from line 6—6 of FIG. 5.
Figure 7:
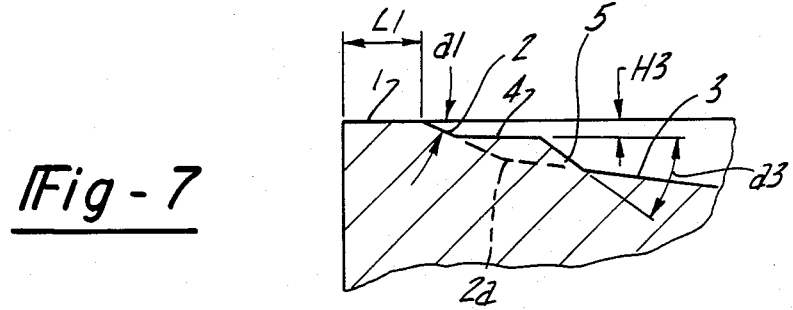
FIG. 7 is a view taken from line 7—7 of FIG. 5.

A cutting tool of the invention, such as the insert set forth in FIGS. 5-7, includes rake face contouring which overcomes the above-described problems with prior art inserts used at relatively high feed rates. With reference to FIGS. 5-7, cutting insert 10 has, for example, substantially square top and bottom chipbreaking faces joined by flank or side walls 7, which are substantially perpendicular to planes containing the top and bottom faces. Four indexable cutting edges are defined by the intersection of flank surface 7 with a land area 1 extending about periphery of a chipbreaking face. As seen in FIG. 6, angle a5 between land 1 and flank surface 7 is substantially 90 degrees.

Adjacent an inner boundary of land 1 and extending downwardly therefrom at an angle a1 to the plane of the chipbreaking face is a first ramp or control surface designated 2a extending between the insert cutting corners, a narrower portion 2 continuing from portion 2a and extending around each radiused cutting corner of insert 10.

Adjacent an inner boundary of each ramp surface 2a and extending downwardly therefrom at an angle a2 to the plane of the chipbreaking face is a second ramp or control surface 3, which terminates at a floor surface 6 substantially parallel to the plane of the chipbreaking face. Insert 10 may be advantageously clamped in cutting position in a variety of known manners utilizing central aperture 11.

At each insert cutting corner, ramp surface 2a is partially interrupted by a recessed plateau or corner control surface 4, which, in this embodiment, is substantially parallel to the plane of the chipbreaking face. An inner boundary of each pedestal surface 4 is, in turn, connected to control surface 3 via third ramp surfaces 5 which extend downwardly at angle a3 to the plane of the chipbreaking face.

The width L1 of land 1 may lie in the range of about 0.015 inches to about 0.035 inches, with a preferred range of about 0.018 inches to about 0.030 inches, thereby providing sufficient corner mass to resist deformation.

Surface 2 and surface 2a extend downwardly at angle a1 having a range of about 10 degrees to about 20 degrees, with a preferred range of about 15 degrees to about 20 degrees, in order to provide a smooth, non-resistant chip flow path. A major portion of chips resulting from relatively large depths of cut then proceeds down ramp surface 3 which extends downwardly at an angle a2 having a range of about 5 degrees to about 15 degrees, with a preferred range of about 5 degrees to about 10 degrees. Preferably, angle a1 is greater than angle a2. With such configuration, surface 3 offers little or no resistance to chip flow, unlike the prior art flat-bottomed insert of FIG. 3 discussed above. Even if crater wear were to occur on surface 3, on detrimental results affecting insert life should result, since surface 3 is spaced sufficiently inwardly of the insert cutting edge.

Although the insert of FIGS. 5-7 must be mounted in a negative rake attitude, the disclosed configuration allows for facile, smooth chip flow over surfaces 1, 2 and 3 with minimal resistance, yet allows chips to curl and break due to their inherent thickness and dynamics. The arrangement of surfaces 1, 2 and 3 thereby overcomes the shoulder and floor generated friction problems encountered with prior art designs. This result is obtained, because the chip, after passing over land 1, confronts positively oriented (i.e. sloping downwardly from a plane of feed direction) surfaces 2 and 3.

The innermost boundary of surface 2a lies a distance H1 below the plane of land 1. Distance H1 has a range of from about 0.004 inches to about 0.010 inches, with a preferred range of from about 0.004 inches to about 0.008 inches. The innermost boundary of surface 3 lies a distance H2 below the plane of land 1. Distance H2 has a range of from about 0.012 inches to a maximum depth limited principally by the required diameter of mounting aperture 11 with a preferred range of from about 0.012 inches to about 0.020 inches.

In order to overcome the above discussed problem of chip convergence and resultant high pressure in the vicinity of the cutting corner nose radius, pedestal or corner control surface 4 with connecting ramp surface 5 is placed inwardly of each insert cutting corner. Surface 4 lies at a depth H3 below the panel of land 1. Depth H3 preferably is on the order of one-half of the depth H1. Surface 5 extends downwardly from an inner boundary of surface 4 at an angle a3 having a useable range of from about 10 degrees to about 25 degrees, with a preferred range of from about 15 degrees to about 20 degrees. With this configuration, stress is reduced in the area of the cutting corner. Another benefit of a corner control surface or pedestal is the ability to effect good chip control at relatively shallow depths of cut. Control surface 4 deflects and breaks chips when the depth of cut is mostly directed to surface 4. Beyond this depth of cut, chips will flow freely due to the configuration of surface 2 and 3. Such free flow, along with the influence of corner control surface 4, creates a barrel-shaped or convex, somewhat embrittled chip conducive to easier breaking. Dimension L2 (FIG. 5) is governed by the radius of curvature of the cutting corner, L2 lying in the preferred range of about one to about one and one-half times such radius.

Figure 8:
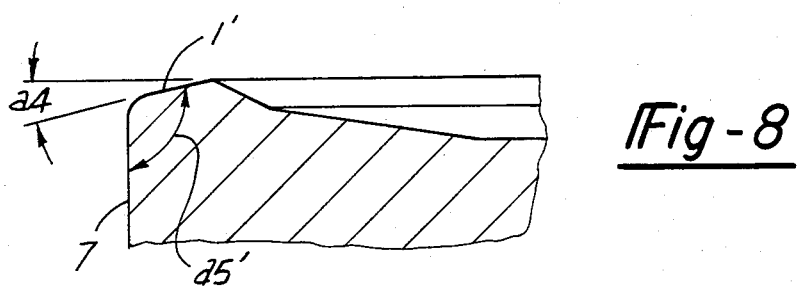
FIG. 8 depicts a cross sectional view of a first alternative embodiment.

FIG. 8 depicts an alternative configuration for a land surface 1' which intersects flank surface 7 at an obtuse angle a5' (i.e. land 1' slopes downwardly toward the cutting edge at an angle a4). This alternative embodiment is beneficial in those applications requiring greater edge strength, such as where hardened materials are being machined. Angle a5 may lie in the range of from about 90 degrees to about 120 degrees, with a preferred range of from about 90 degrees to about 100 degrees.

Figure 9:
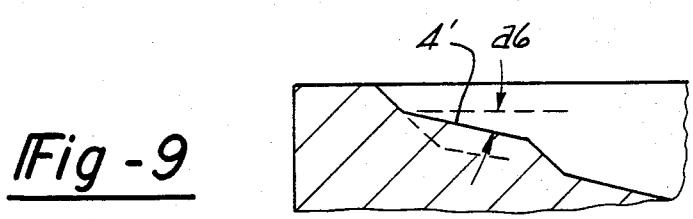
FIG. 9 depicts a cross sectional view of a second alternative embodiment.

FIG. 9 sets forth yet another alternative to the embodiment of FIGS. 5-7, wherein each corner pedestal or control surface 4' extends downwardly at angle a6 to the plane of the chipbreaking face. Angle a6 is selected to be less than angle a1 of first ramp surface 2 (FIG. 7). With a downward slope, corner control surface 4' may offer less resistance to free flowing chips in the insert cutting corner region.

Figure 10:
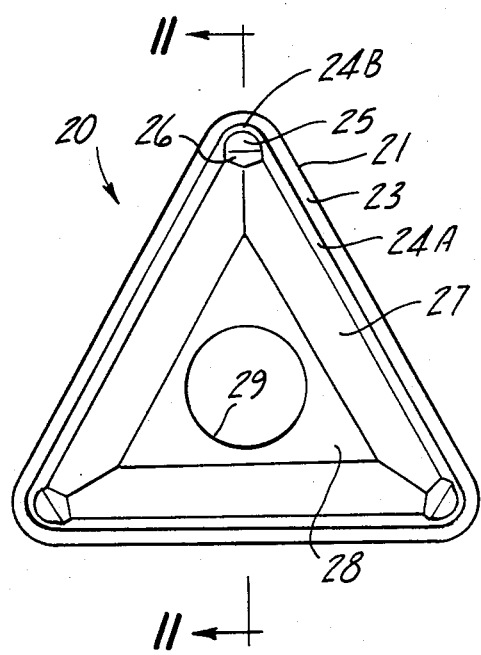
FIG. 10 depicts a top plan view of an alternatively shaped cutting insert designed in accordance with the principles of the invention.
Figure 11:
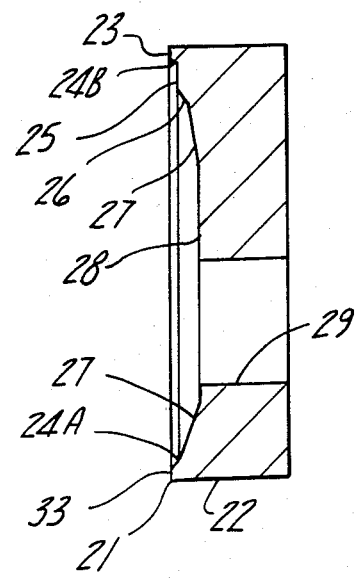
FIG. 11 depicts a view taken from line 11—11 of FIG. 10.

A triangular insert designed in accordance with the principles of the invention is set forth in FIGS. 10 and 11. In a prototype triangular insert tested under relatively heavy feed rates in excess of 0.020 inches per revolution, insert 20 equipped with conventional mounting aperture 29 includes land 23, preferably about 0.018 inches wide, intersecting flank surfaces 22 at an angle of about 90 degrees to thereby define cutting edge 21. First ramp surface 24A, 24B extends downwardly from an inner boundary of land 23 at an angle of about 15 degrees to an inner boundary located about 0.006 inches below the plane of land 23. Second ramp surface 27 extends downwardly from the inner boundary of surface 24A at an angle of about 7 degrees to a floor surface 28 located at a depth of about 0.016 inches below the plane of land 23. In each corner, pedestal surface 25 interrupts surface 24B at a depth of about 0.003 inches below the plane of land 23. Third ramp surface 26 extends downwardly at an angle of about 20 degrees to connect the inner boundary of pedestal 25 to ramp surface 27.

The invention has been described with reference to preferred embodiments solely for the sake of example and without exclusion of those alternatives which will become apparent to those skilled in the art. For example, the various control and ramp surfaces described could be arcuate rather than planar, so long as the intersections of the various surfaces are tangentially joined in a manner such that will eliminate chip impinging barriers. The invention is to be limited solely by the scope and spirit of the appended claims.

I claim:

1. In a tool for cutting chip forming materials having a cutting corner defined by the intersection of a chipbreaker surface and two flank surfaces and a cutting edge extending from the cutting corner along a boundary of one of the flank surfaces, the improvement comprising:
    a land surface extending inwardly from the cutting corner and the cutting edge;
    a first ramp control surface extending continuously along the cutting edge and the cutting corner from an inner boundary of the land surface downwardly at a first angle to the plane of the chipbreaker surface;
    a corner control surface lying adjacent the first ramp control surface only in the cutting corner and extending inwardly from an intersection with the first ramp control surface so as to partially interrupt the first ramp control surface only in the cutting corner;
    a second ramp control surface lying adjacent the corner control surface only in the cutting corner extending from an intersection with the corner control surface downwardly at a second angle to the plane; and
    a third ramp control surface extending parallel to the cutting edge and adjacent the first ramp control surface except in the cutting corner wherein an intersection of the first and third ramp control surfaces is interrupted by the second ramp control surface the third ramp control surface extending downwardly at a third angle to the plane, the corner control surface and the second ramp control surface thereby narrowing the width of the first ramp control surface only at the cutting corner.

2. The improvement of claim 1 wherein the corner control surface extends substantially parallel to the plane of the chipbreaker surface.

3. The improvement of claim 2 wherein the land surface extends substantially parallel to the plane of the chipbreaker surface.

4. The improvement of claim 2 wherein the land surface intersects the flank surface at an obtuse angle.

5. The improvement of claim 1 wherein the corner control surface extends downwardly from its intersection with the first ramp control surface at an angle to the plane which is less than the first angle.

6. A cutting insert comprising a polygonal body having opposed top and bottom faces lying in substantially parallel planes and a polygonal peripheral surface formed by side surfaces substantially perpendicular to the planes and joining conjunctively at cutting corners of the polygon, wherein at least one of the top and bottom faces includes:
    a substantially planar land extending continuously about the entire periphery of the polygon and intersecting each of the side surfaces to define peripheral cutting edges extending between cutting corners;
    a substantially planar first ramp surface extending continuously along an intersection with the land and downwardly at a first angle to the planes from an inner boundary of the land;
    a substantially planar third ramp surface extending downwardly at a second angle to the planes from an inner boundary of the first ramp surface;
    substantially planar corner control surfaces, one positioned only at each cutting corner so as to interrupt a portion of the first ramp surface thereby narrowing the width of the first ramp surface in each cutting corner region; and
    substantially planar second ramp surfaces, one of each connecting an inner boundary of a corresponding corner control surface to the third ramp surface and interrupting an intersection of the first and third ramp surfaces in each cutting corner region.

7. The cutting insert of claim 6 wherein the land is substantially perpendicular to the side surfaces.

8. The cutting insert of claim 7 wherein the corner control surfaces are substantially parallel to the planes.

9. The cutting insert of claim 8 wherein the land extends inwardly from the cutting edge a distance on the order of 0.015 inches to 0.035 inches.

10. The cutting insert of claim 8 wherein the first ramp surface extends downwardly with the first angle on the order of 10 degrees to 20 degrees to the intersection with the second ramp surface on the order of 0.004 inches to 0.010 inches below a plane containing the land.

11. The cutting insert of claim 8 wherein the second ramp surface extends downwardly with the second angle on the order of 5 degrees to 15 degrees to a distance on the order of at least 0.012 inches below a plane containing the land.

12. The cutting insert of claim 8 wherein the corner control surfaces each intersect the first ramp surface at a distance on the order of 0.002 inches to 0.005 inches below a plane containing the land.

13. The cutting insert of claim 8 wherein the third ramp surfaces each extend downward at an angle to the parallel planes of the top and bottom faces on the order of 10 degrees to 25 degrees.

14. The cutting insert of claim 8 wherein the land extends inwardly from the cutting edge a distance on the order of 0.018 inches, the first ramp surface extends downwardly with the first angle on the order of 15 degrees to an intersection with the second ramp surface on the order of 0.006 inches below a plane containing the land, the second ramp surface extends downwardly with the second angle on the order of 7 degrees to a distance on the order of 0.016 inches below the plane containing the land, the corner control surfaces each intersect the first ramp surface on the order of 0.003 inches below the plane containing the land, and the third ramp surfaces each extend downwardly at an angle to the parallel planes of the top and bottom faces on the order of 20 degrees.

* * * * *